United States Patent
Werner

(10) Patent No.: US 9,136,510 B2
(45) Date of Patent: Sep. 15, 2015

(54) SEALING AND FOLDING BATTERY PACKS

(71) Applicant: Apple Inc., Cupertino, CA (US)

(72) Inventor: Christopher M. Werner, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/685,051

(22) Filed: Nov. 26, 2012

(65) Prior Publication Data
US 2014/0147730 A1    May 29, 2014

(51) Int. Cl.
*H01M 2/02*    (2006.01)
*H01M 10/04*    (2006.01)

(52) U.S. Cl.
CPC .......... *H01M 2/0217* (2013.01); *H01M 2/0207* (2013.01); *H01M 10/0436* (2013.01); *Y10T 29/4911* (2015.01); *Y10T 29/49114* (2015.01)

(58) Field of Classification Search
None
See application file for complete search history.

(56) References Cited

U.S. PATENT DOCUMENTS

| | | | |
|---|---|---|---|
| 2,798,895 | A | 7/1957 | Nowotny |
| 2,798,896 | A | 7/1957 | Bly |
| 5,580,676 | A | 12/1996 | Honda et al. |
| 6,106,973 | A | 8/2000 | Sonozaki et al. |
| 6,358,644 | B1 * | 3/2002 | Shibata et al. ................ 429/162 |
| 6,528,204 | B1 | 3/2003 | Hikmet et al. |
| 6,924,551 | B2 | 8/2005 | Rumer et al. |
| 7,288,340 | B2 | 10/2007 | Iwamoto |
| 7,356,923 | B2 | 4/2008 | Honer |
| 7,622,895 | B1 | 11/2009 | Griffin |
| 7,663,064 | B2 | 2/2010 | Dutta et al. |
| 7,910,243 | B2 | 3/2011 | Koh et al. |
| 8,031,122 | B2 | 10/2011 | Jang et al. |
| 8,034,477 | B2 | 10/2011 | Yamada |
| 8,119,278 | B2 | 2/2012 | Bailey et al. |
| 8,124,269 | B2 | 2/2012 | Takahashi et al. |
| 8,241,786 | B2 | 8/2012 | Taniguchi et al. |
| 8,259,013 | B2 | 9/2012 | Jang et al. |
| 8,260,371 | B2 | 9/2012 | Kawata et al. |
| 8,293,402 | B2 | 10/2012 | Lee |
| 8,427,825 | B2 | 4/2013 | Szczypinski |
| 8,558,509 | B2 | 10/2013 | He et al. |
| 8,603,670 | B2 | 12/2013 | Taniguchi et al. |

(Continued)

FOREIGN PATENT DOCUMENTS

| | | |
|---|---|---|
| EP | 0792741 | 2/1986 |
| EP | 1931010 | 6/2008 |

(Continued)

*Primary Examiner* — Patrick Ryan
*Assistant Examiner* — Haixia Zhang
(74) *Attorney, Agent, or Firm* — Brownstein Hyatt Farber Schreck, LLP

(57) ABSTRACT

In a first embodiment, a battery pouch is provided with a pouch edge positioned to project from an underside of the battery. The pouch edge is sealed and folded toward the underside of the battery. The folded pouch edge increases a vertical dimension of the resulting battery assembly, but not a horizontal dimension. In a second embodiment, a battery pouch is provided with a first pouch edge positioned on a first edge of the battery and a second pouch edge positioned on a second edge of the battery. The battery pouch is configured such that at least one cut-out portion is positioned between either the first and second edge of the battery or between the first and second pouch edges. When the first and second ouch edges are sealed and folded upward, the folding does not cause creases that increase a horizontal dimension of the battery assembly.

16 Claims, 14 Drawing Sheets

(56) References Cited

U.S. PATENT DOCUMENTS

| | | |
|---|---|---|
| 2003/0129483 A1 | 7/2003 | Gross |
| 2007/0154794 A1* | 7/2007 | Kim et al. ............... 429/162 |
| 2007/0264535 A1 | 11/2007 | Lee et al. |
| 2009/0246620 A1 | 10/2009 | Lee et al. |
| 2009/0317708 A1 | 12/2009 | Brandl et al. |
| 2010/0081049 A1 | 4/2010 | Holl et al. |
| 2010/0316911 A1 | 12/2010 | Tesson et al. |
| 2011/0076550 A1 | 3/2011 | Liang et al. |
| 2011/0175569 A1 | 7/2011 | Austin |
| 2011/0210954 A1 | 9/2011 | Murphy et al. |
| 2011/0215480 A1 | 9/2011 | Gorczyca et al. |
| 2011/0236727 A1 | 9/2011 | Jang |
| 2011/0287318 A1 | 11/2011 | Loveness et al. |
| 2012/0116176 A1 | 5/2012 | Moravec et al. |
| 2012/0121944 A1 | 5/2012 | Yamamoto et al. |
| 2013/0034763 A1 | 2/2013 | Byun |
| 2013/0053110 A1 | 2/2013 | Pope et al. |
| 2013/0071696 A1 | 3/2013 | Kim et al. |
| 2013/0171490 A1 | 7/2013 | Rothkopf et al. |
| 2014/0050948 A1 | 2/2014 | Hashimoto et al. |
| 2014/0065474 A1 | 3/2014 | Werner et al. |
| 2014/0147703 A1 | 5/2014 | Werner et al. |

FOREIGN PATENT DOCUMENTS

| | | |
|---|---|---|
| EP | 2540221 | 1/2013 |
| EP | 2653053 | 10/2013 |
| JP | 61032951 | 2/1986 |
| JP | 63314770 | 12/1988 |
| JP | 10012200 | 1/1998 |
| JP | 2000058018 | 2/2000 |
| JP | 2001118547 | 4/2001 |
| JP | 2001250516 | 9/2001 |
| JP | 2001332752 | 11/2001 |
| JP | 2007165200 | 6/2007 |
| KR | 20090075396 | 7/2009 |
| WO | WO00/41252 | 7/2000 |
| WO | WO2008/023199 | 2/2008 |
| WO | WO2011/000239 | 1/2011 |

* cited by examiner

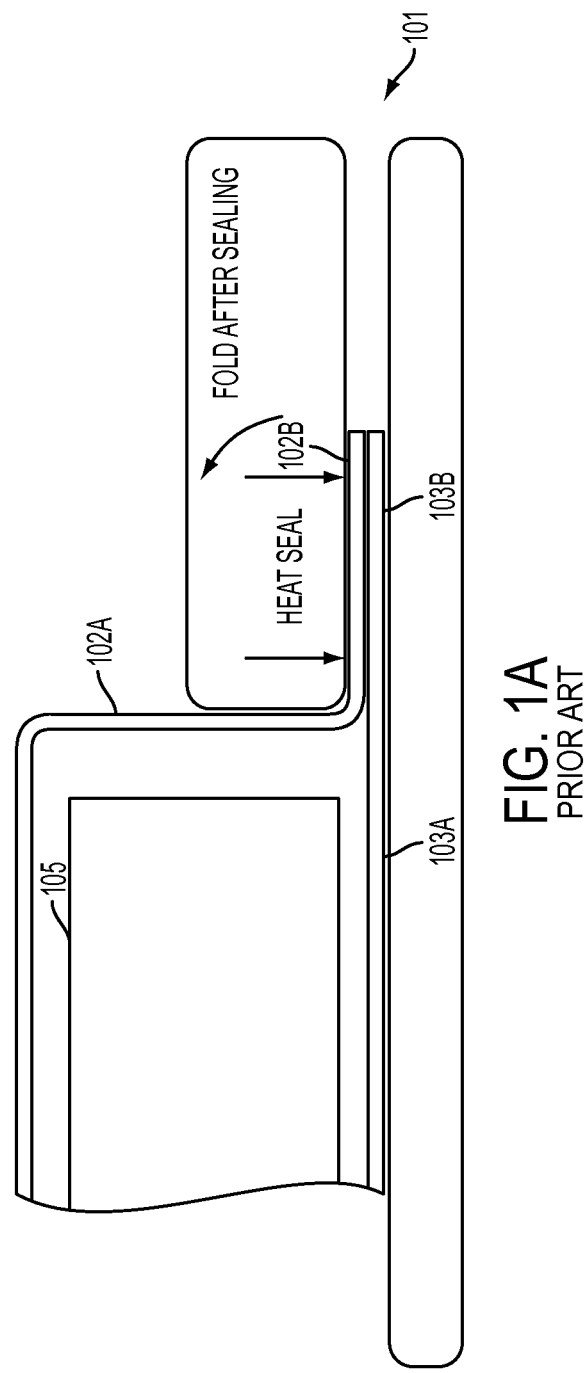

SEALING AND FOLDING BATTERY PACKS

TECHNICAL FIELD

This disclosure relates generally to battery packs, and more specifically to sealing and folding of battery packs to reduce space required for seals.

BACKGROUND

Battery packs often include one or more energy storage components that are placed within a battery pouch. The battery pouch often includes one or more edges and these edges are often sealed. FIG. 1A illustrates sealing of an edge of such a prior art battery pack.

As illustrated in FIG. 1A, the battery pack 101 includes an energy storage component 105 positioned within a top battery pouch portion 102A and a bottom battery pouch portion 103A. A top edge portion 102B of the top battery pouch portion and a bottom edge portion 103B of the bottom battery pouch portion project from a side of the battery pack.

Typically, the top edge portion and bottom edge portion are sealed together and may then be folded upward approximately ninety degrees, as illustrated in FIG. 1B. However, as can be seen in FIG. 1B, folding the sealed top edge portion and bottom edge portion upward increases a horizontal dimension of the battery pack, thereby increasing the "footprint" (i.e., horizontal space occupied by the battery).

In some cases, the sealed portions are not folded at all. However, not folding of the sealed portions further increases the horizontal dimensions of the battery as horizontal space is required for the entire area of the sealed portions.

As illustrated in FIG. 10, the sealed top edge portion and bottom edge portion could be folded downward one hundred and eighty degrees. However, in addition to the increase in the vertical dimension of the battery illustrated as the area "z," this would still increase the horizontal dimension of the battery by the portion of the fold in the "x1" area. Further, most sealed battery pouch edges cannot be folded up to one hundred and eighty degrees without cracking and/or otherwise compromising the seal.

Further, corners of battery packs can also result in increases to horizontal battery dimensions. FIG. 4A illustrates a typical battery pack 401 that has a corner where two edges (402 and 403) of the battery 404 meet. The battery pack has a pouch edge 405 corresponding to the battery edge 402 and a pouch edge 406 corresponding to the battery edge 403. As illustrated, the pouch edges 405 and 406 are contiguous, meeting at and forming a pouch edge corner.

However, when the pouch edges are sealed and folded upward (as illustrated in FIG. 4B), creases 407 (or folds) may form. These creases may extend the horizontal dimension of the corner. As such, the creases may increase the horizontal space occupied by the battery pack.

SUMMARY

The present disclosure discloses battery assemblies (packs) and methods for sealing and folding battery assemblies.

In one or more embodiments, a battery pouch may be provided with at least one pouch edge positioned to project from an underside of the battery. The pouch edge may be sealed and folded toward the underside of the battery. In this way, the folded pouch edge may increase a vertical dimension of the resulting battery assembly, but may not increase a horizontal dimension of the battery assembly.

In one or more other embodiments, a battery pouch may be provided with a first pouch edge positioned on a first edge of the battery and a second pouch edge positioned on a second edge of the battery. The battery pouch may be configured such that at least one cut-out portion is positioned between either the first and second edge of the battery or between the first and second pouch edges. In this way, when the first and second ouch edges are sealed and folded upward, the first and second edges may not cause creases that increase a horizontal dimension of the battery assembly.

In some implementations, the cut-out portion may be positioned between the first pouch edge and the second pouch edge. In such implementations, creases may not be formed and thus may not contribute to a horizontal dimension of the resulting battery assembly. In other implementations, the cut-out portion may be positioned between the first edge and the second edge. In such implementations, creases may be formed within the cut-out portion and may thus still not increase a horizontal dimension of the resulting battery assembly beyond that already defined by the first and second edges of the battery edges.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

FIG. 1A is a side view of a prior art sealing of an edge of a portion of a battery pack.

DETAILED DESCRIPTION

The description that follows includes sample methods and apparatuses that embody various elements of the present disclosure. However, it should be understood that the described disclosure may be practiced in a variety of forms in addition to those described herein.

The present disclosure discloses battery assemblies (or packs) and methods for sealing and folding battery assemblies. In one or more embodiments, a battery pouch may be provided. At least one pouch edge of the battery pouch may be positioned such that the pouch edge projects from an underside of the battery. The pouch edge may be sealed and folded toward the underside of the battery without requiring that the pouch edge be folded sufficiently to cause cracking or other compromising of the seal. In this way, the folded pouch edge may increase a vertical dimension of the resulting battery assembly, but may not increase a horizontal dimension of the battery assembly. As such, the "footprint" of the battery assembly (i.e., the space required for the battery assembly) may be minimized.

In one or more other embodiments, a battery pouch may be provided. A first pouch edge of the battery pouch may be positioned on a first edge of the battery and a second pouch edge of the battery pouch may be positioned on a second edge of the battery. The battery pouch may be configured such that at least one cut-out portion is positioned between either the first and second edge of the battery or between the first and second pouch edges. In this way, when the first and second ouch edges are sealed and folded upward, the first and second edges may not cause creases to form and the folding may not increase a horizontal dimension of the battery assembly.

Figure 1B:
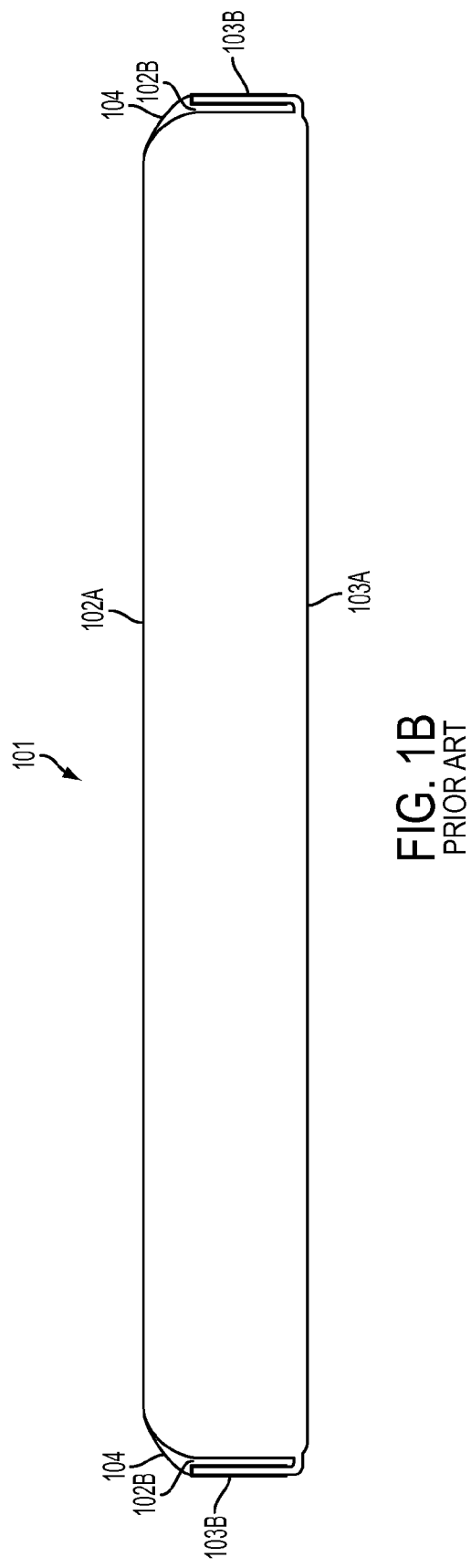
FIG. 1B is a side view of the prior art battery pack of FIG. 1A after the edges have been folded upwards ninety degrees.
Figure 1C:
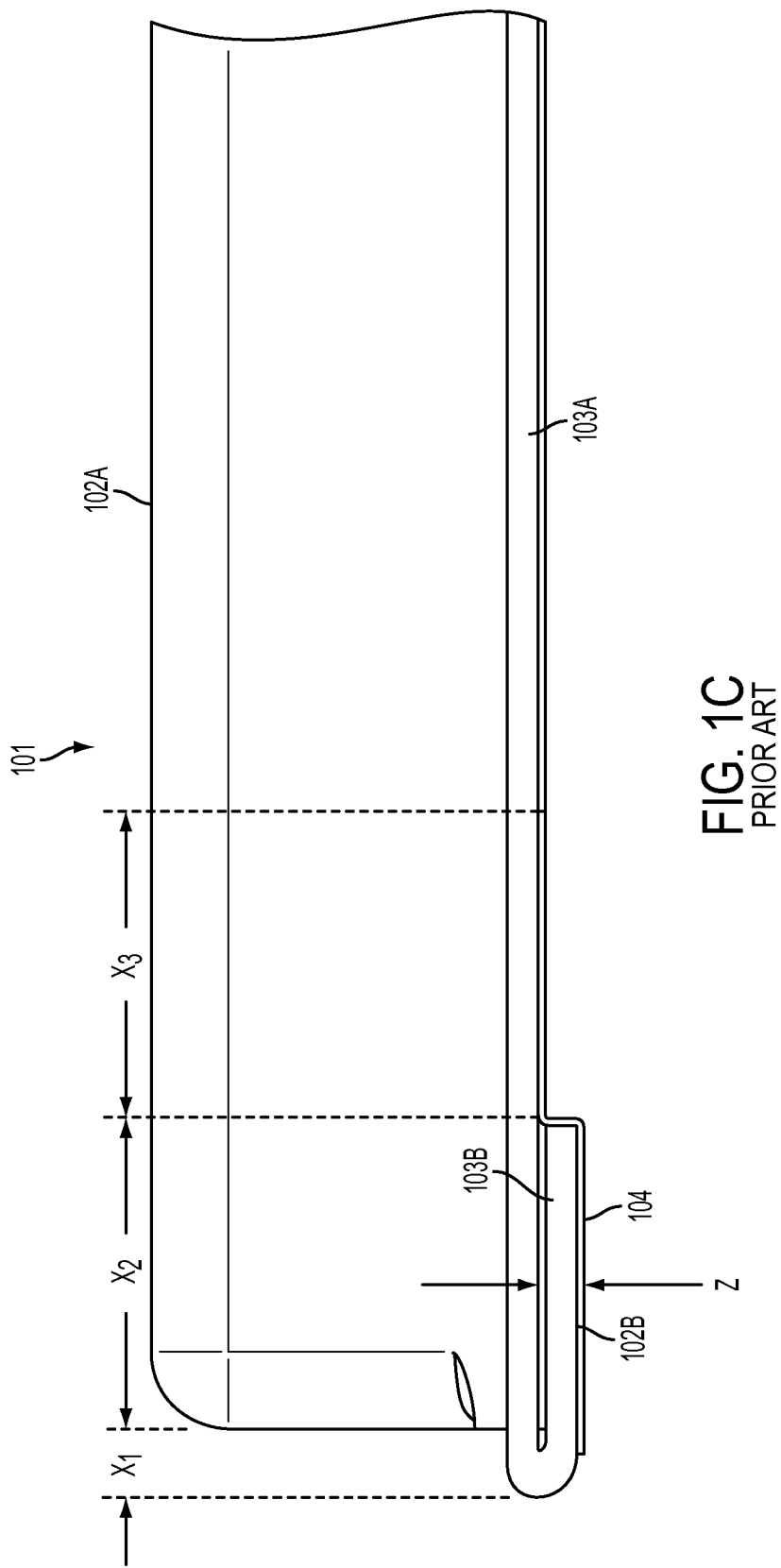
FIG. 1C is a side view of a portion of the prior art battery pack of FIG. 1A after the edges have been folded downward one hundred and eighty degrees.
Figure 2A:
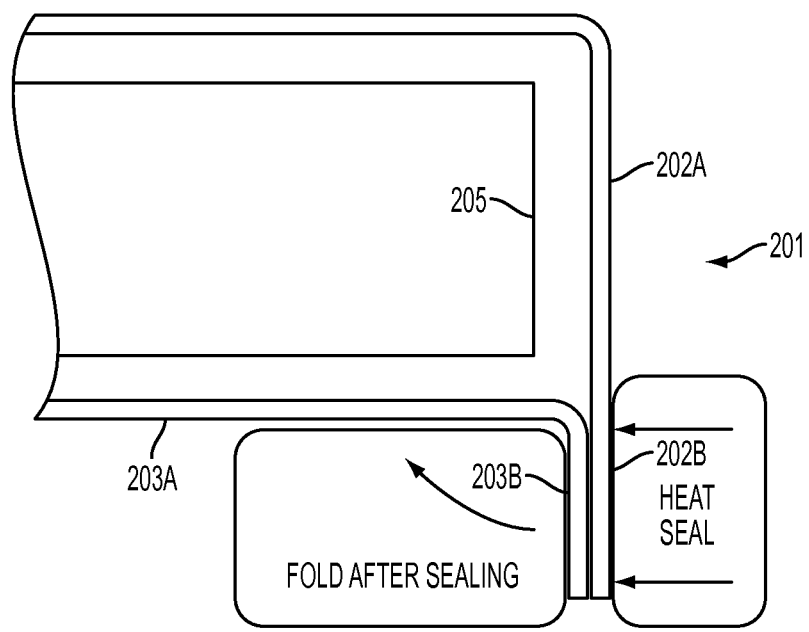
FIG. 2A is a side view of a sealing of an edge of a portion of a battery pack.

FIG. 2A illustrates sealing of an edge of a battery assembly (or pack) 201 in accordance with one or more embodiments of the present disclosure. The battery assembly may be utilized in a variety of different electrical devices, such as one or more mobile computing devices, laptop computers, personal digital assistants, tablet computers, digital music players, digital video players, cellular telephones, smart phones, wireless computer peripherals, battery powered kitchen appliances, and so on.

As illustrated, the battery assembly 201 includes an energy storage component 105 positioned within a top battery pouch portion 202A and a bottom battery pouch portion 203A. The energy storage component may be the portion of the battery assembly that is operable to store energy or power for the battery assembly. A top edge portion 202B of the top battery pouch portion and a bottom edge portion 203B of the bottom battery pouch portion project from the underside of the battery assembly. The top edge portion and bottom edge portion may be sealed together (such as by heating, or heat sealing, the top edge portion and/or the bottom edge portion) and then folded downward approximately ninety degrees toward the underside of the battery, as illustrated in FIG. 2B.

Figure 2B:
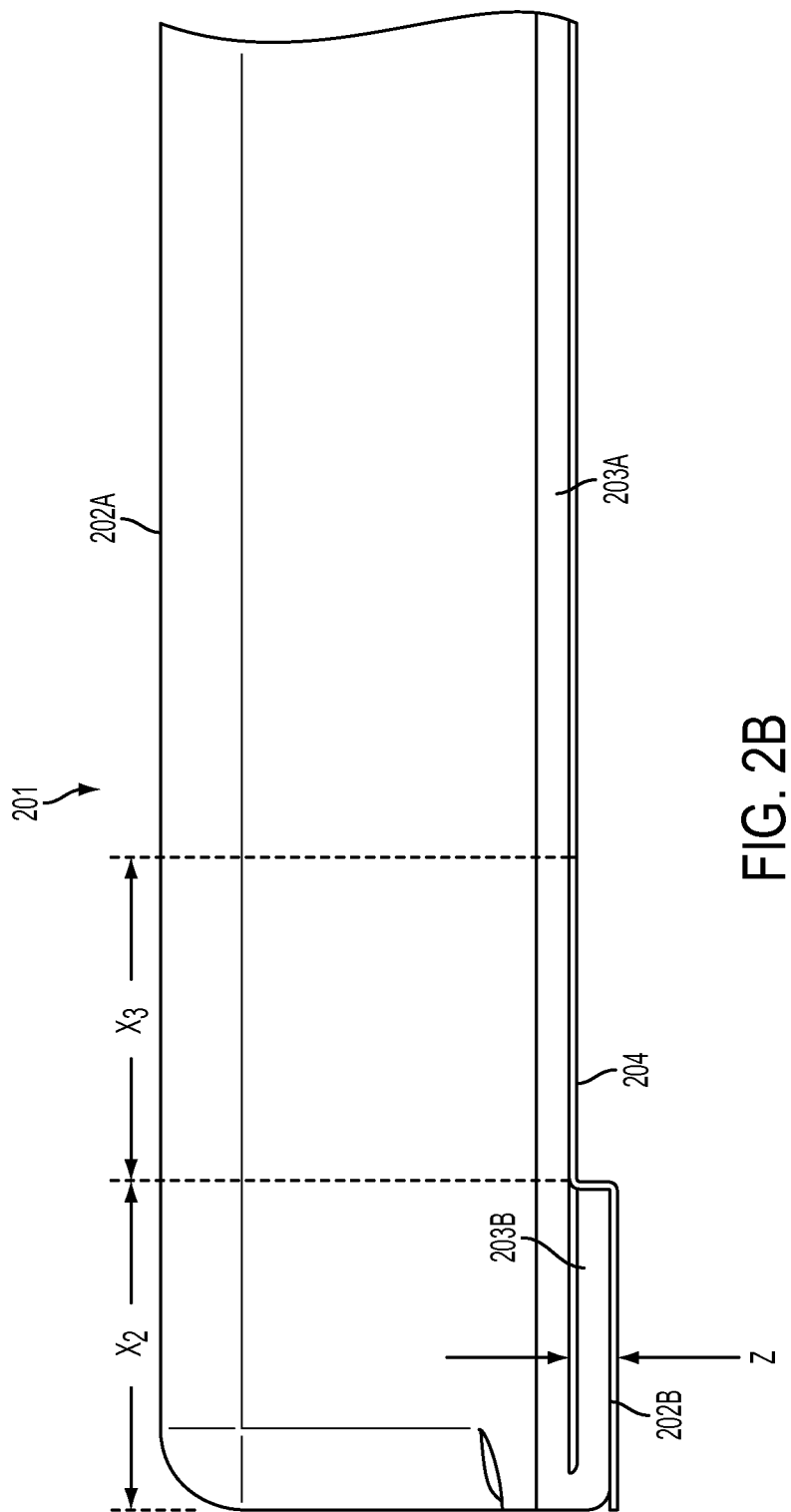
FIG. 2B is a side view of the battery pack of FIG. 2A after the edges have been folded downward ninety degrees.

As shown in FIG. 2B, the folded top and bottom edge portions 202B and 203B may be attached to the underside of the battery. As illustrated, tape 204 (which may be insulating tape) may be utilized to attach the top and/or bottom edge portion to the underside of the battery. However, it is understood that this is an example. Other mechanisms or techniques may be utilized to attach the top and/or bottom edge portion to the underside of the battery. For example, an adhesive may be placed between the top and/or bottom edge portion and the underside of the battery which may attach the top and/or bottom edge portion to the underside of the battery.

As can be seen in FIG. 2B, the folding of the top and bottom edge portions 202B and 203B do not increase a horizontal dimension of the battery assembly 201. As can also be seen in FIG. 2B, the folding of the top and bottom portions may increase a vertical dimension (corresponding to the area depicted as "z") of the battery.

The increase in the vertical dimension caused by the folding of the top and bottom portions may define a space on the underside of the battery and one or more components, such as one or more battery components (such as one or more electrical connector tabs that deliver energy or power from the battery assembly to an electrical device into which the battery assembly is incorporated, one or more flexible connectors, one or more power control modules that perform operations such as monitoring a temperature of the battery assembly and such, and so on) or one or more components of an electrical device into which the battery assembly 201 is incorporated, may be positioned in this space to at least partially minimize the space required by such components.

It should be understood that although FIGS. 2A and 2B are illustrated and described as including a single pouch edge that projects from an underside of the battery and is sealed and folded towards the underside of the battery, this is an example implementation. In various implementations, multiple edges may project from the underside of the battery and may be sealed and folded toward the underside of the battery without departing from the scope of the present disclosure. Additionally, though one or more edges may project from the underside of the battery and may be sealed and folded toward the underside of the battery, in various implementations one or more additional edges may not project from the underside of the battery and/or may not be sealed and folded toward the underside of the battery (such as being folded upward and/or otherwise folded) without departing from the scope of the present disclosure.

Figure 3:
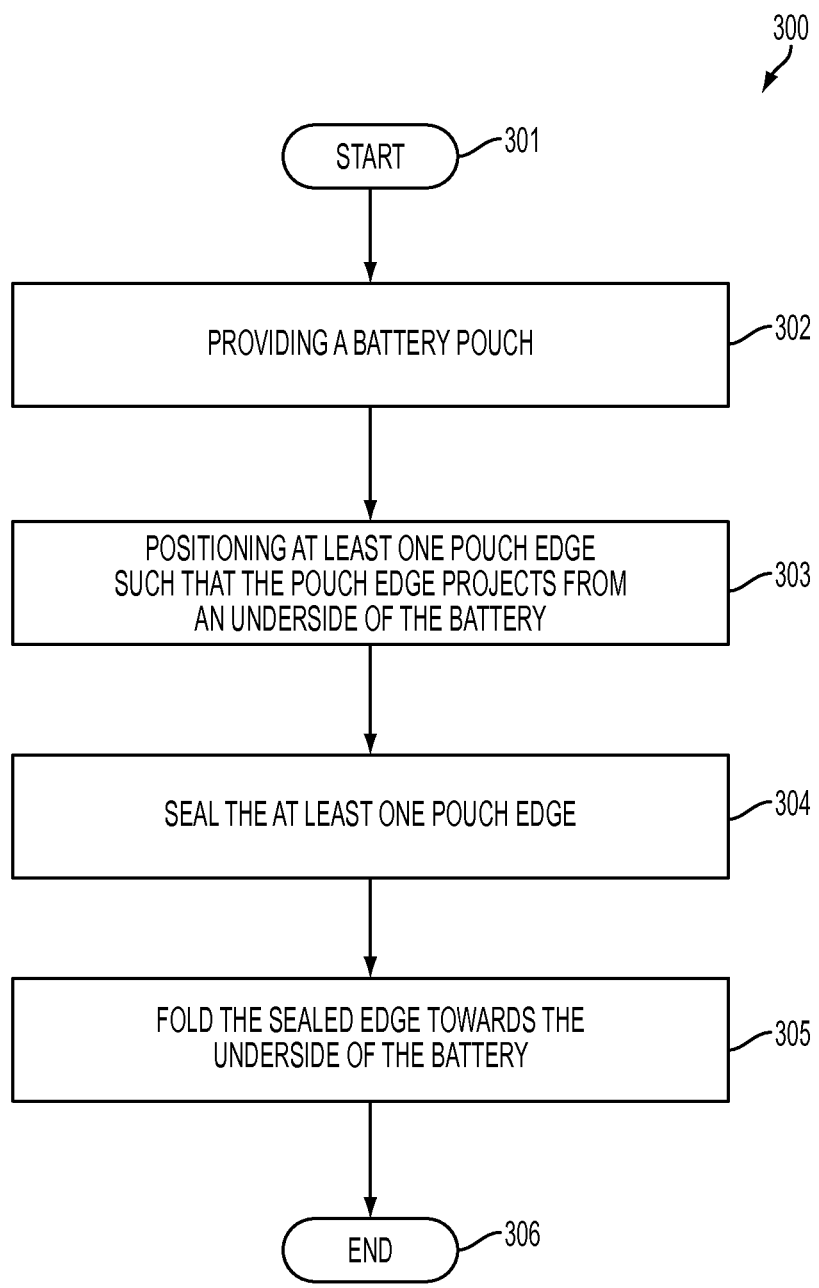
FIG. 3 is a method diagram illustrating a method for assembling a battery. The battery may be the battery pack of FIGS. 2A-2B.
Figure 4A:
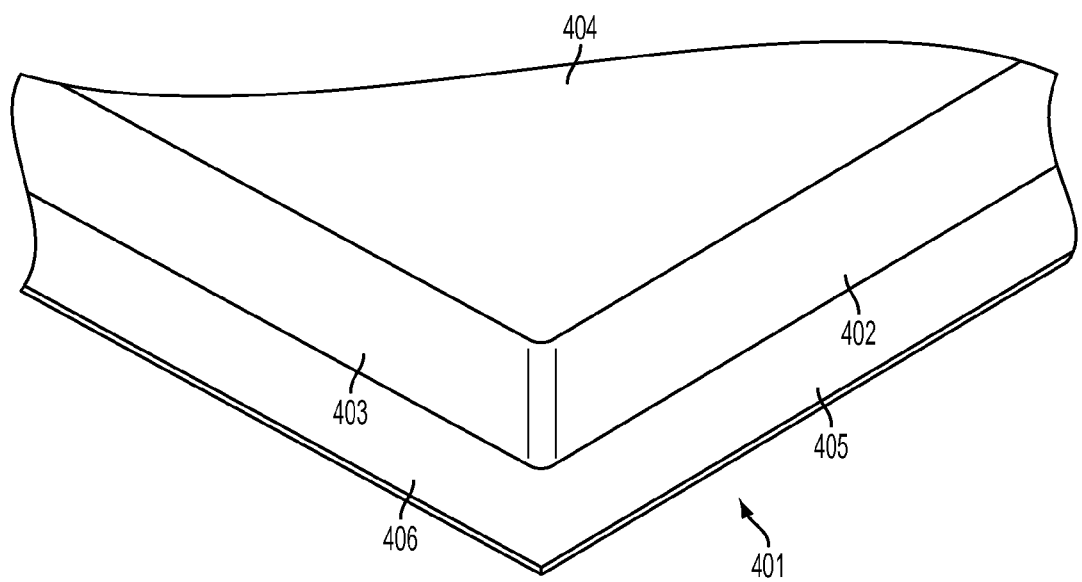
FIG. 4A is an isometric view of a prior art battery pack that includes at least two contiguous battery edges and two contiguous pouch edges connected to the two battery edges.
Figure 4B:
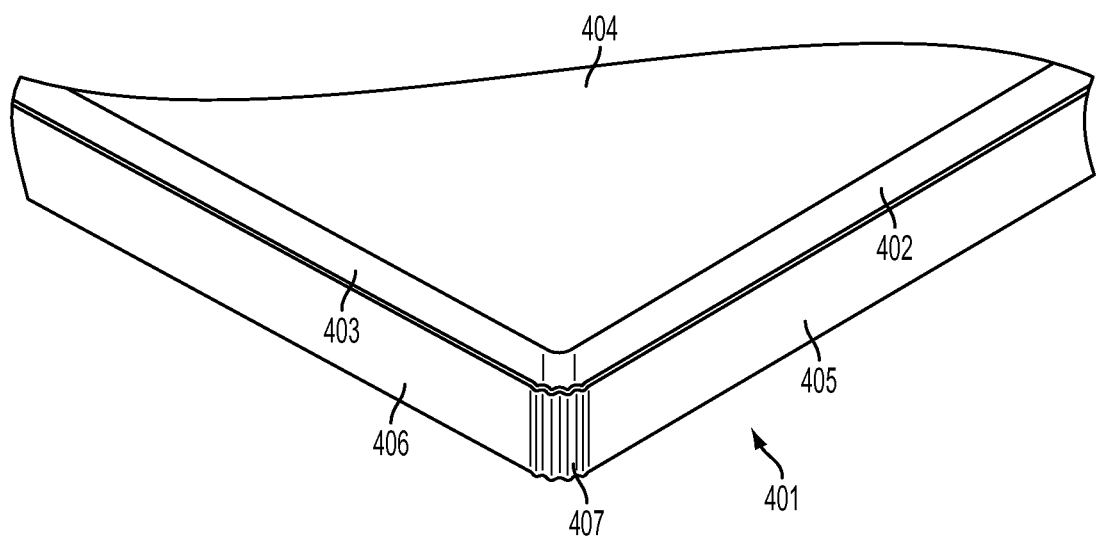
FIG. 4B is an isometric view of the prior art battery pack of FIG. 4A after the two contiguous pouch edges have been folded upward.

FIG. 3 illustrates a method 300 for assembling a battery. The battery may be the battery assembly 201 of FIGS. 2A and 2B.

The flow begins at block 301 and proceeds to block 302 where a battery pouch is provided. The flow then proceeds to block 303 where at least one pouch edge is positioned such that the pouch edge projects from an underside of the battery. Then, the flow proceeds to block 304 where the pouch edge is sealed (such as with a heat sealing process). Next, at block 305, the sealed edge is folded toward the underside of the battery. The flow then proceeds to block 306 and ends.

It is understood that though the method 300 is illustrated and described above as including particular operations performed in a particular order, other orderings (which may include different operations) are possible. By way of a first example, in various implementations the method 300 may also include operations such as attaching of the folded edges to the underside of the battery with tape, adhesive, or other such attachment mechanisms. By way of a second example, in one or more implementations, the method 300 may include an operation of placing one or more energy storage components inside the battery pouch before the pouch edges are sealed and folded.

Figure 5A:
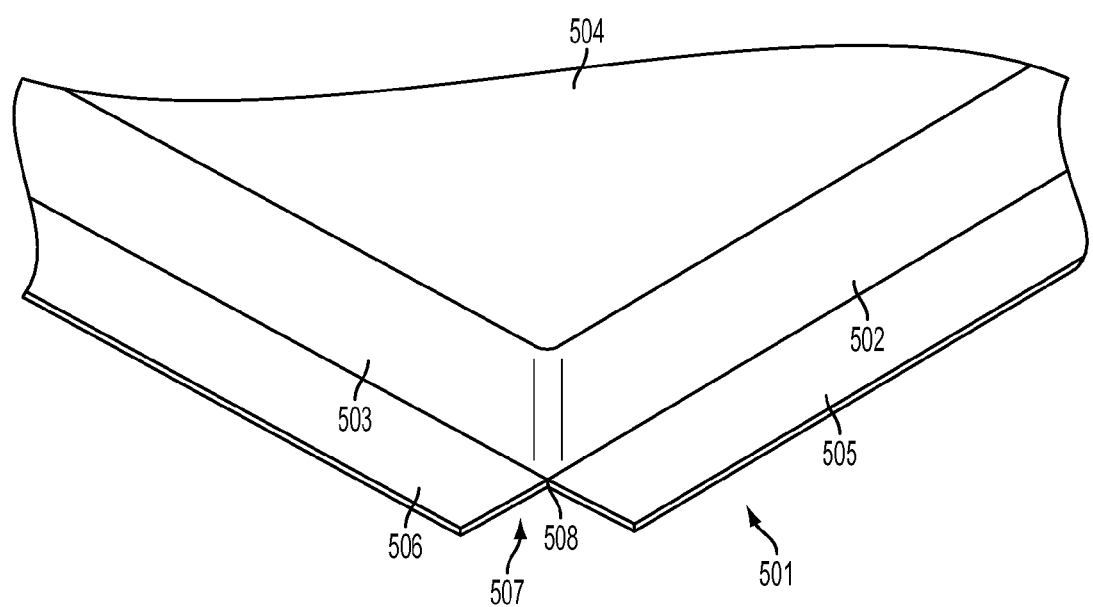
FIG. 5A is an isometric view of a battery pack that includes at least two contiguous battery edges and two non-contiguous pouch edges connected to the two battery edges.

FIG. 5A illustrates a battery assembly (or pack) 501 in accordance with various embodiments of the present disclosure. The battery assembly may be utilized in a variety of different electrical devices, such as one or more mobile computing devices, laptop computers, personal digital assistants, tablet computers, digital music players, digital video players, cellular telephones, smart phones, wireless computer peripherals, battery powered kitchen appliances, and so on.

As illustrated, the battery assembly 501 includes a battery pouch body 504 that has a corner where two battery edges (502 and 503) of the battery pouch body meet. The battery assembly has a first pouch edge 505 corresponding to the battery edge 502 and a second pouch edge 506 corresponding to the battery edge 503. As illustrated, the pouch edges 505 and 506 are not contiguous, meaning that they do not meet at a pouch edge corner. Instead, a gap 507 is defined between the pouch edges, forming a cut-out portion between the two pouch edges.

Figure 5B:
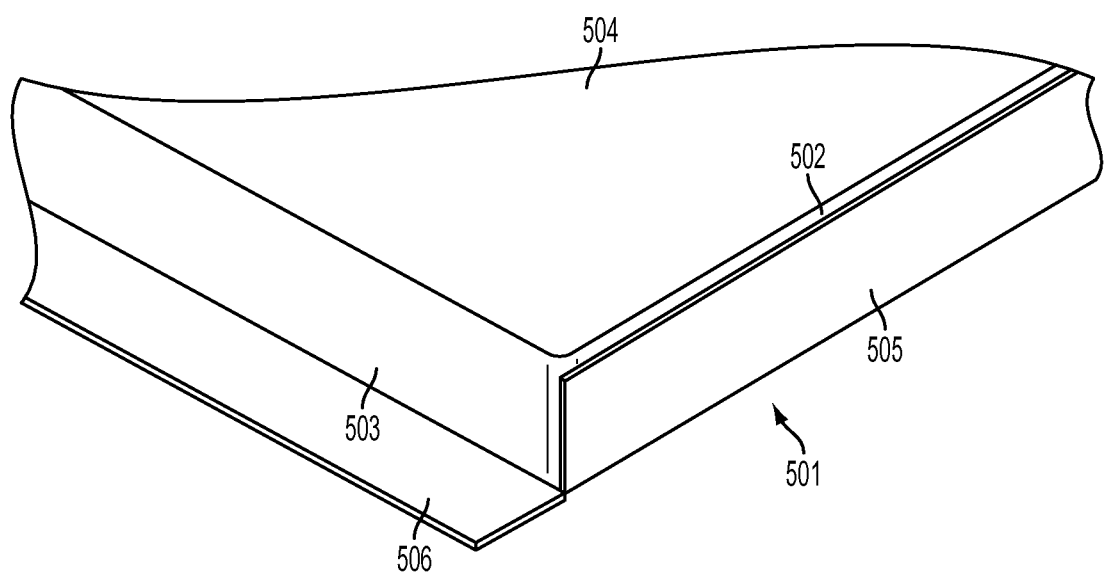
FIG. 5B is an isometric view of the battery pack of FIG. 5A after one of the two pouch edges has been folded upward.
Figure 5C:
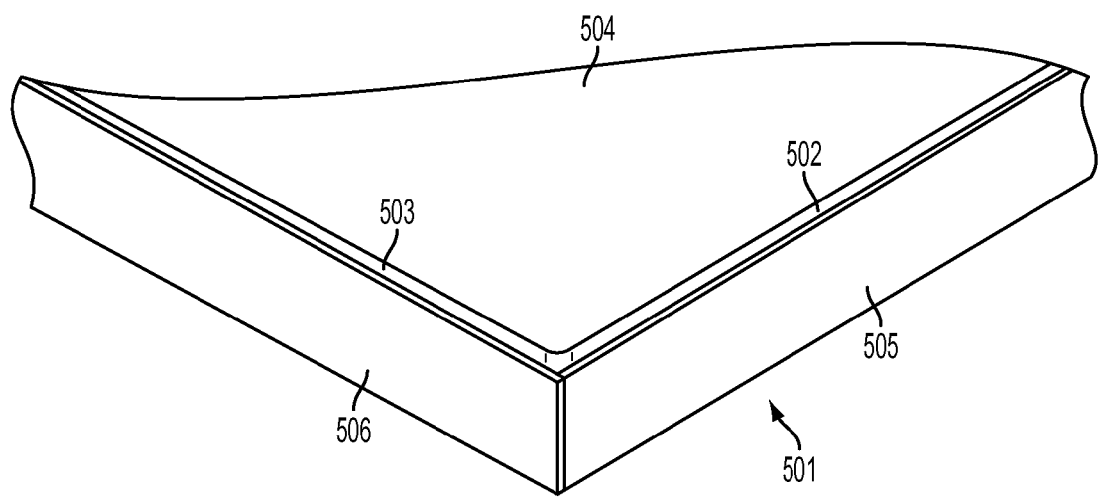
FIG. 5C is an isometric view of the battery pack of FIG. 5A after both pouch edges have been folded upward.

When the pouch edges 505 and 506 are sealed and folded upward (as illustrated in FIGS. 5B and 5C), the gap 507, or cut-out portion, between the pouch edges may prevent creases or folds from forming. Because the creases may not be formed, the horizontal dimension of the corner, and thus the horizontal space occupied by the battery pack, may not be increased by the folding.

However, with reference again to FIG. 5A, the gap 507, or cut-out portion, may form one or more regions 508 that do not have the same amount of seal as the rest of the pouch edges 505 and 506. Essentially, as the gap includes an area not occupied by the pouch edges 505 and 506, the regions 508 may not include the same area of pouch material in which a seal may be formed.

It should be understood that although FIGS. 5A-5C are illustrated and described as folding the pouch edges 505 and 506 upward, this is an example implementation. In various other implementations, one or more pouch edges of a battery assembly may be folded upward, downward, otherwise folded, or not folded at all without departing from the scope of the present disclosure.

Figure 6A:
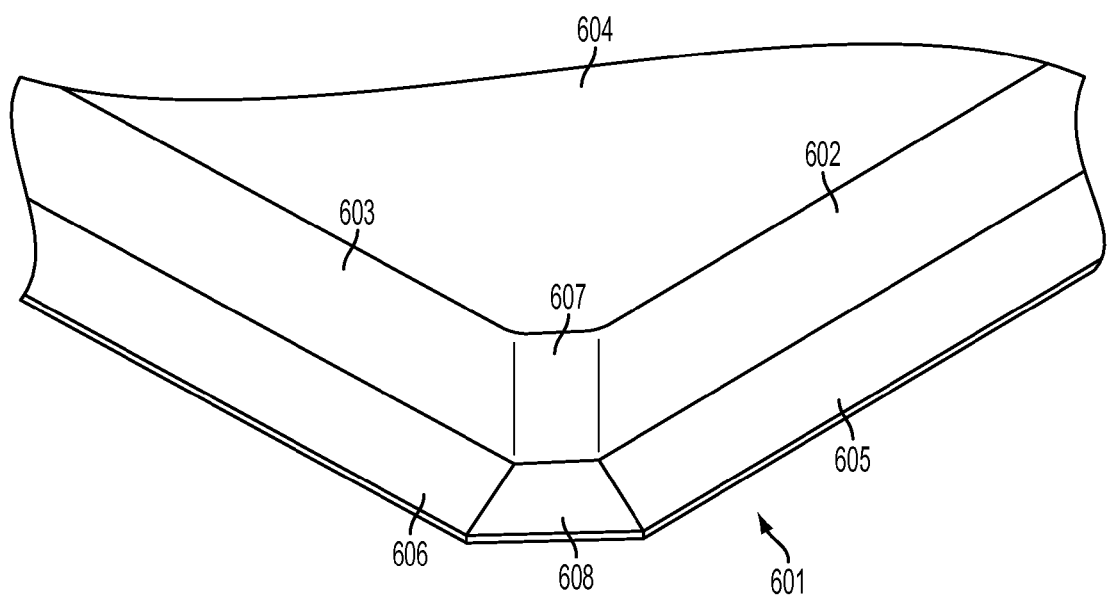
FIG. 6A is an isometric view of a battery pack that includes at least two non-contiguous battery edges connected by a third battery edge and three contiguous pouch edges connected to the three battery edges.

FIG. 6A illustrates a battery assembly (or pack) 601 in accordance with one or more other embodiments of the present disclosure. The battery assembly may be utilized in a variety of different electrical devices, such as one or more mobile computing devices, laptop computers, personal digital assistants, tablet computers, digital music players, digital video players, cellular telephones, smart phones, wireless computer peripherals, battery powered kitchen appliances, and so on.

As illustrated in FIG. 6A, the battery assembly 601 includes a battery pouch body 604 that has two battery edges 602 and 603. However, the battery edges 602 and 603 are not contiguous, meaning that they do not meet. Instead of the battery edges 602 and 603 meeting at an approximately ninety degree angle and forming a corner, the battery edges 602 and 603 meet via a third battery edge 607, with respect to which the battery edges 602 and 603 meet at angles less than approximately ninety degrees (such as forty five degree angles). As such, the third battery edge 607 and the battery edges 602 and 603 define a cut-out portion where the battery edges 602 and 603 would have met.

The battery assembly has a first pouch edge 605 corresponding to the battery edge 502, a second pouch edge 606 corresponding to the battery edge 603, and a third pouch edge 608 corresponding to the third battery edge 607. As illustrated, the pouch edges 605, 606, and 608 are contiguous, meaning that the pouch edge 605 and the pouch edge 606 each meet via the third pouch edge 608.

For purposes of illustration, may battery assemblies are rectangular. Essentially, such batteries have four edges and four corners (each corner being the meeting point at approximate ninety degree angles of two of the edges). However, such a rectangular battery assembly, where the corners were "cut-out" by the respective edges meeting an edge such as the third battery edge 608 described above at angles less than ninety degrees instead of each other, would be octagonal instead of rectangular. However, the battery assembly would only be octagonal if this was performed on all four corners. If this was performed on less than all four corners, an irregular shape may result instead of a rectangle or an octagon.

Figure 6B:
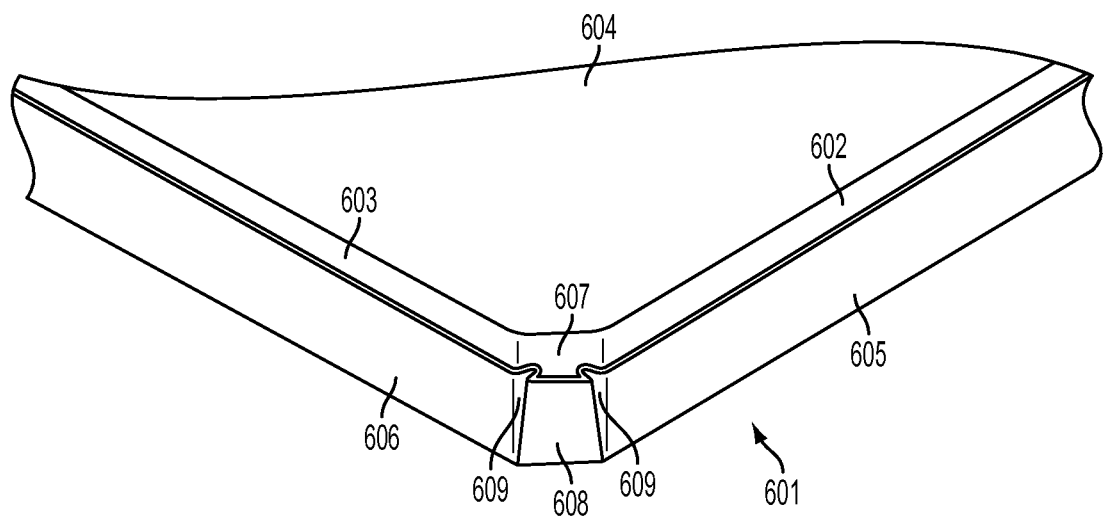
FIG. 6B is an isometric view of the battery pack of FIG. 6A after the pouch edges have been folded upward.

Returning to FIG. 6A, when the pouch edges 605, 606, and 608 are sealed and folded upward (as illustrated in FIG. 6B), creases (or folds) 609 may form. However, the creases or folds may form between the third edge 607 and the cut-out portion where a corner would have been formed by the battery edge 602 meeting with the battery edge 603. As such, because the creases are formed within the cut-out portion, horizontal dimensions of the battery may not be increased by the creases beyond the horizontal dimensions already defined by the battery edges 602 and 603.

Thus, creases may be formed by folding of one or more pouch edges without increasing horizontal dimensions of the battery. Further, as all of the areas of the pouch edges 605, 606, and 608 include the same amount of area for sealing, areas of weaker or lesser amounts of seal may not be formed.

Further, although FIGS. 6A and 6B are illustrated and described above with the first pouch edge 605 and the second pouch edge 606 being contiguous with the third pouch edge 608, it is understood that this is an example implementation. In other implementations, the first pouch edge and/or the second pouch edge may not be contiguous with the third pouch edge, forming an additional cut-out portion or gap between the first pouch edge and the third pouch edge and/or between the second pouch edge and the third pouch edge.

It should be understood that although FIGS. 6A and 6B are illustrated and described as folding the pouch edges 605 and 606 upward, this is an example implementation. In various other implementations, one or more pouch edges of a battery assembly may be folded upward, downward, otherwise folded, or not folded at all without departing from the scope of the present disclosure.

Figure 7:
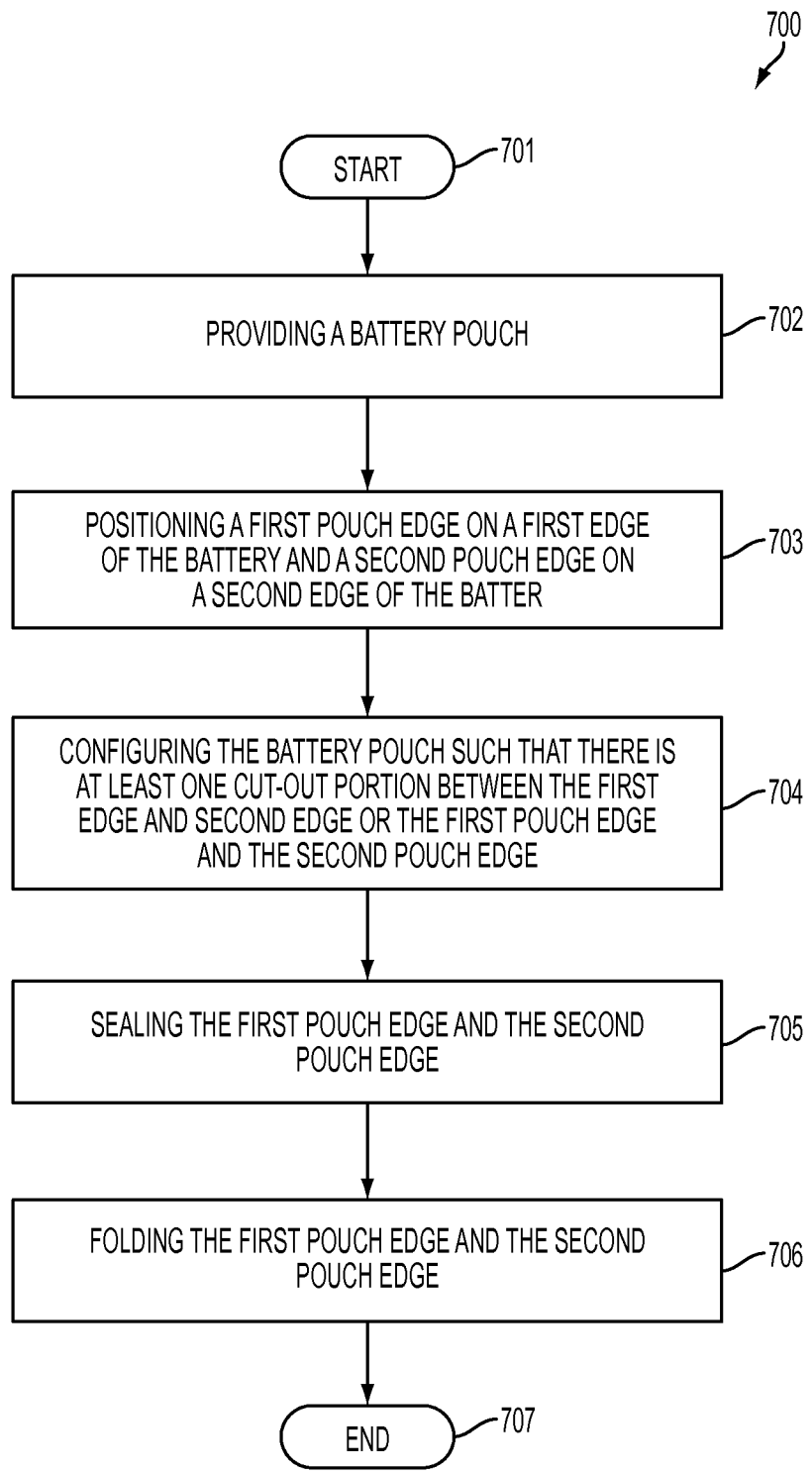
FIG. 7 is a method diagram illustrating a method for assembling a battery. The battery may be the battery pack of FIGS. 5A-5C and/or 6A-6B.

FIG. 7 illustrates a method 700 for assembling a battery. Such a battery may be the battery assembly 501 of FIGS. 5A-5C. Such battery may also be the battery assembly 601 of FIGS. 6A-6B.

The flow begins at block 701 and proceeds to block 302 where a battery pouch is provided. The flow then proceeds to block 703 where a first pouch edge is positioned on a first edge of the battery pouch and a second pouch edge is positioned on a second edge of the battery pouch. Then, the flow proceeds to block 704 where the battery pouch is configured such that there is at least one cut out portion.

In some implementations, such as the battery assembly 501 of FIGS. 5A-5C, the cut-out portion may be positioned between the first pouch edge and the second pouch edge. In other implementations, such as the battery assembly 601 of FIGS. 6A-6B, the cut-out portion may be positioned between the first edge and the second edge.

Returning to FIG. 7, the flow next proceeds to block 705 where the first pouch edge and the second pouch edge are sealed. Then, the flow proceeds to block 706 where the first pouch edge and the second pouch edge are folded. The first pouch edge and/or the second pouch edge may be folded upward, downward, or otherwise folded. Finally, the flow proceeds to block 708 and ends.

It is understood that though the method 700 is illustrated and described above as including particular operations performed in a particular order, other orderings (which may include different operations) are possible. By way of a first example, in various implementations, the first pouch edge and/or the second pouch edge may be attached to the battery assembly after folding, such as via tape, adhesive, and so on. By way of a second example, in one or more implementations, the method 700 may include an operation of placing one or more energy storage components inside the battery pouch before the pouch edges are sealed and folded.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for assembling a battery, comprising:
   providing at least one battery pouch having side pouch edges;
   positioning the side pouch edges to project from a perimeter of an underside of the battery prior to sealing of the side pouch edges;
   sealing the side pouch edges; and
   folding the sealed side pouch edges toward the underside of the battery.

2. The method of claim 1, wherein the operation of sealing the side pouch edges further comprises:
   heat sealing the side pouch edges.

3. The method of claim 2, wherein the operation of heat sealing the side pouch edges further comprises:
   applying heat to at least one surface of the side pouch edges.

4. The method of claim 1, wherein the side pouch edges contribute to a vertical dimension of the battery but not a horizontal dimension of the battery after the side pouch edges are folded.

5. The method of claim 1, further comprising:
   attaching the folded side pouch edges to the underside of the battery.

6. The method of claim 5, wherein the operation of attaching the folded side pouch edges to the underside of the battery further comprises:
   adhering the folded side pouch edges to the underside of the battery utilizing tape.

7. The method of claim 6, wherein the tape comprises insulating tape.

8. The method of claim 5, wherein the operation of attaching the folded side pouch edges to the underside of the battery further comprises
   adhering the folded side pouch edges to the underside of the battery utilizing adhesive positioned between the folded side pouch edges and the underside of the battery.

9. The method of claim 1, further comprising:
   positioning at least one component in at least one space defined by the folded side pouch edges.

10. The method of claim 1, further comprising:
    including the battery in at least one mobile computing device.

11. The method of claim 1, further comprising locating at least one energy storage component in the at least one battery pouch.

12. The method of claim 11, wherein the operation of locating at least one energy storage component in the at least one battery pouch is performed before the operation of sealing the side pouch edges.

13. The method of claim 1, wherein the operation of folding the sealed side pouch edges toward an underside of the battery further comprises folding the sealed side pouch edges ninety degrees.

14. The method of claim 9, wherein the at least one component comprises at least one battery connector tab.

15. The method of claim 9, wherein the at least one component comprises at least one flexible connector.

16. The method of claim 9, wherein the at least one component comprises at least one power control module.

* * * * *